United States Patent [19]

Nicholas et al.

[11] 4,302,060

[45] Nov. 24, 1981

[54] FLUID FILM POCKET BEARING

[76] Inventors: John C. Nicholas, 1779 Chester Rd., Apt. 1, Bethlehem, Pa. 18017; Robley G. Kirk, 143 Applewood Dr., Easton, Pa. 18042

[21] Appl. No.: 92,357

[22] Filed: Nov. 8, 1979

[51] Int. Cl.³ .............................................. F16C 32/06
[52] U.S. Cl. ......................................... 308/9; 308/122
[58] Field of Search .............. 308/9, 122, 240, DIG. 1

[56] References Cited

U.S. PATENT DOCUMENTS 3,671,137  6/1972  Ball ..................................... 308/122

*Primary Examiner*—Frederick R. Schmidt
*Attorney, Agent, or Firm*—Bernard J. Murphy; David W. Tibbott

[57] ABSTRACT

A fluid-film, pocket bearing of the three axial-groove-type, which has three bearing pads but only two pressure pockets. The design of the bearing provides significant stabilization and a capacity for supporting heavy loads with the predominant pocket loading being horizontal thereof. One of the pads, in the lower half of the bearing, encompasses the location whereat loading thereof obtains, and this one pad has no pressure pocket. The trailing edges of the two pockets (in the other pads) are smoothly blended into the pad surfaces.

24 Claims, 6 Drawing Figures

FLUID FILM POCKET BEARING

This invention pertians to a fluid-film, pocket bearing of the three axial-groove-type having a plurality of bearing pads with pressure pockets in one or more of the pads, and in particular to an improved bearing of the type noted which is especially designed to exhibit a predominantly horizontal pocket loading.

The published literature comprises various plural pocket bearing designs: the 3 pad-3 pocket bearing, and a 4 pad-4 pocket design; the classic step journal bearing is another example of known pocket bearing designs. However, the step journal bearing loads the journal in the vertical direction, predominantly. Many axial compressors and gas turbines provide extremely heavy gravity loads on the supporting bearings, and an additional vertical load is at best not necessary and can in fact be very detrimental to bearing performance.

Also, the multi-pad, multi-pocket bearings mentioned above contain pockets in the bottom pads. At low speeds, the load capacity is severely reduced since the pocket is hydrodynamically ineffective. This is an extremely important consideration since many machines must slow roll and/or idle at low speeds.

It is an object of this invention to set forth a design for a bearing which retains the basic advantages of the known, simple, three axial-groove design, i.e. high load capacity, and the ability to withstand large imbalance loads, while producing a stabilized bearing which is not characterized by excessive vertical pocket loading, rather, which exhibits a predominantly horizontal pocket loading, and which provides good damping and stiffness.

It is another object of this invention to set forth a fluid-film, pocket bearing, for journaling a rotary shaft, comprising an annulus having inner and outer circumferential surfaces, and an axial center; means defining a plurality of bearing pads on said inner surfaces; means communicating said inner and outer surfaces, for admitting fluid to said inner surface; and relieved pockets formed in said inner surface; wherein said pockets comprises means for effecting loading of said bearing predominantly horizontally thereof.

Further objects of this invention, as well as the novel features thereof, will become more apparent by reference to the following description, taken in conjunction with the accompanying figures in which.

Figure 1:
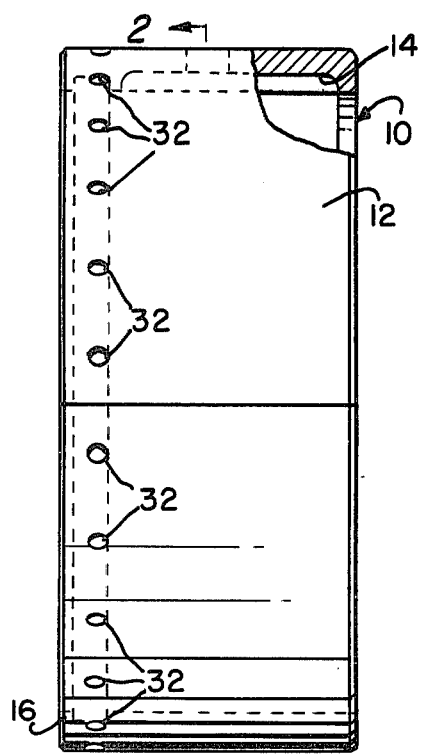
FIG. 1 is a side, elevational view of an embodiment of the bearing according to the invention, with a portion cut away for clarity.

As shown in the figures, the bearing 10 comprises a two-part annulus 12 having inner and outer circumferential surfaces 14 and 16, respectively, on the inner surface 14 of which are defined bearing pads 18, 18a and 18b. Equally spaced apart, circumferentially of the inner surface 14, are three axial grooves 20, 20a and 20b in which to receive fluid. Each of the grooves have ports 22 opening thereonto which communicate with the outer surface 16 of the annulus 12 for admitting fluid into the grooves 20, 20a and 20b, and onto the inner surface 14.

Figure 2:
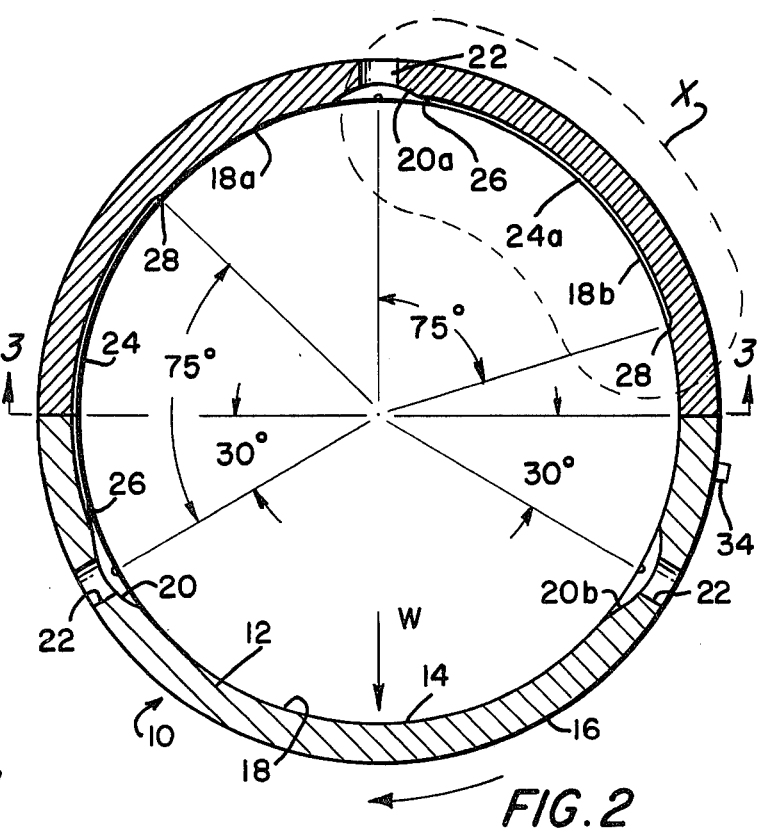
FIG. 2 is a cross-sectional view taken along section 2—2 of FIG. 1.
Figure 4:
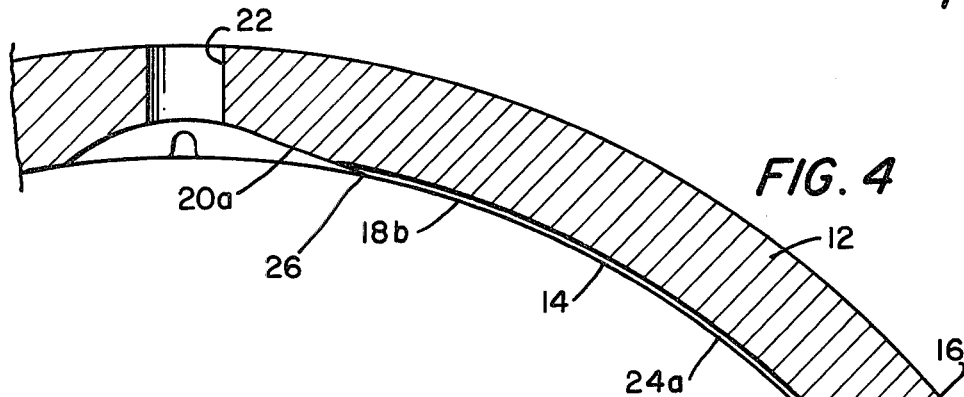
FIG. 4 is an enlarged and fragmentary cross-sectional view of area "X" in FIG. 2.

With reference particularly to FIG. 2, the pads may be defined as an upper left pad 18a, upper right pad 18b, and a lower pad 18. The upper left and upper right bearing pads 18a and 18b have pressure pockets 24 and 24a formed therein, which extend circumferentially of the annulus 12 for approximately seventy-five degrees of arc. The direction of rotation (for a shaft to be journaled by the annulus) is indicated by the external arrow shown in the upper left-hand portion of FIG. 2. With regard to the direction of shaft rotation, the pockets 24 and 24a have leading and trailing edges 26 and 28, respectively. Throughout substantially the circumferential length thereof, the pockets have a substantially uniform depth. The optimum depth is from two to four time the radial clearance which is determined shall obtain between the surface of the pads and the surface of a shaft to be journaled in the bearing. However, the two pockets 24 and 24a are smoothly blended in at the trailing edges 28 thereof to define, at the termination thereof, a common surface with the respective bearing pads 18a and 18b.

Figure 3:
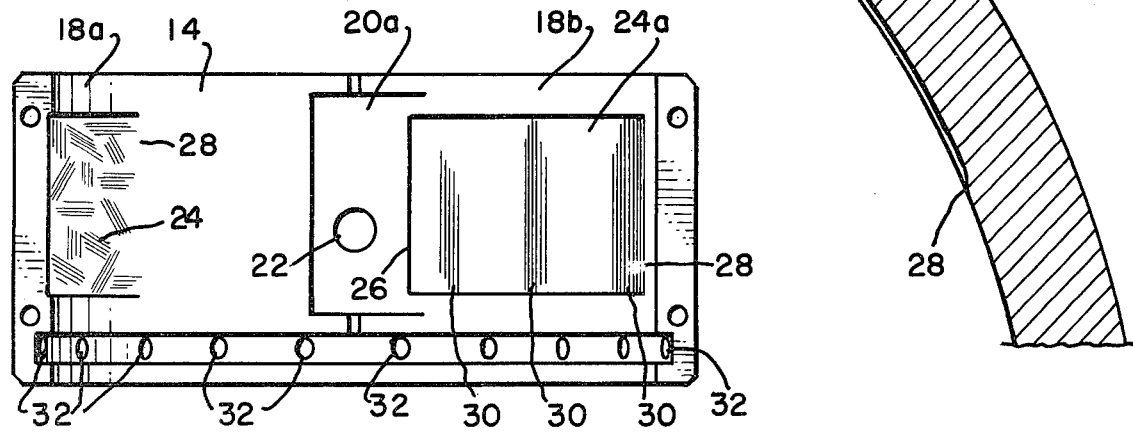
FIG. 3 is a view taken along lines 3—3 of FIG. 2 showing in particular the bearing pads and pockets of the upper half of the annulus.

As shown in FIG. 3, the pressure pocket 24a in the upper right hand pad 18b has a multiplicity of fine ribs 30 formed therein, extending axially. The ribs 30 of approximately one hundred microns in height, are formed to increase turbulence within the pocket 24a in order to enhance the pressure generation therewithin. The upper left-hand pocket 24, as shown, is rough or unfinished, again for the same purpose of creating a beneficial turbulence therewithin.

As noted above, pockets 24 and 24a are blended in at the trailing edges 28, and have the aforesaid optimum depth. Accordingly, as particularly evidenced in FIG. 3 with shading, the leading edge(s) 26 defines an abrupt recessed step, of said optimum depth, relative to the surface of the bearing pads 18a and 18b. The blended-in trailing edges 28, however, are a novel departure.

Typical, prior art pressure pockets having sharp steps at the trailing edges thereof, and this has been common practice pursuant to an understanding that inertia forces occasioned by the sharp steps will increase the pocket loading. However, we have made the discovery that this is a misconception; we have found a sharp step at the trailing edges is detrimental, that the effects of inertia detract from the loading of the pressure pockets and, in fact, the smooth blending of the trailing edges 28 is more beneficial to the loading of the pockets 24 and 24a and the resultant stability of the bearing 10.

The lower bearing pad 18 is substantially bisected whereat bearing load (represented by the radially-directed arrow) obtains, and in order to insure that pocket loading of the bearing will be predominantly horizontal, and/or to increase load capacity at low speeds, this lower pad has no pocket therein. As a result, then, the substantially opposed pockets 24 and 24a yield predominate horizontal stiffness and damping. The pockets 24 and 24a are straight cuts or reliefs which obviate any necessity for accurate pocket profile cams or numerical control cutting devices for the forming thereof. FIG. 1 shows a multiplicity of apertures 32 about the periphery of the annulus 12, and FIG. 2 shows a dowel 34 inserted in one of the apertures. By this provision, the annulus may be rotationally indexed, relative to a concentric housing having a single dowel-receiving aperture therein, so that by rotationally orienting the annulus, and setting the dowel in an appropriate aperture 32, an optimumization of pocket-loading direction and stabilization may be selectively realized.

Figure 5:
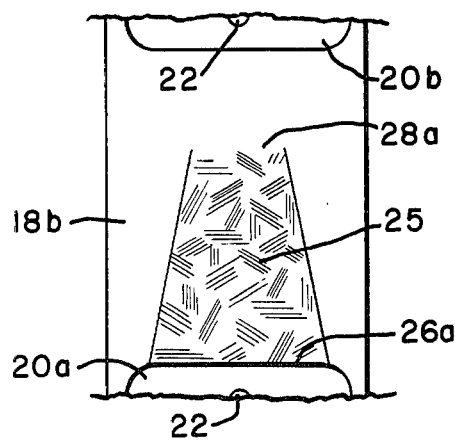
FIG. 5 is a view similar to that of FIG. 3, showing an alternative embodiment of the pressure pockets.

FIG. 5 depicts a view of an alternative pressure pocket 25. This comprises an alternative configuration of the principals set forth in this disclosure which takes advantage of yet another method of producing load capacity in the turbulent pockets. As shown, the axial length of the pocket 25 tapers in the circumferential direction. This lends itself to an optimum load and hence stiffness of the pocket and therefore the stiffness of the bearing in the horizontal direction. The teaching of this disclosure is not restricted to the pocket shapes depicted; rather the ambit of the invention encompasses pockets of any arbitrary shape.

Figure 6:
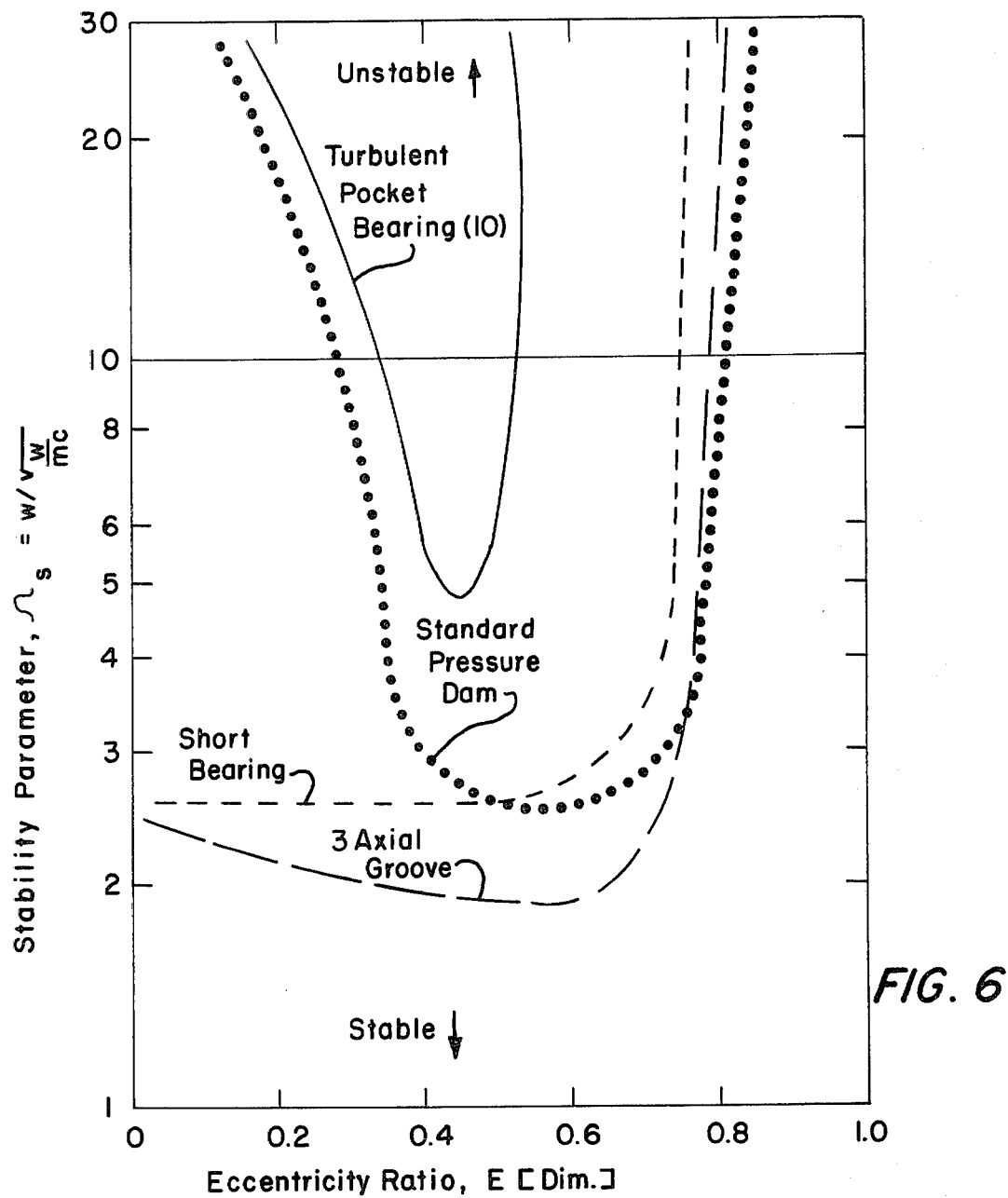
FIG. 6 is a chart on which the operating stability parameter for the new bearing is plotted.

On FIG. 6 are plotted the stability parameters for known, prior art bearings and our fluid-film "turbulent" pocket bearing. Patently, our design offers a bearing 10 in which the stability threshold is greatly increased.

While we have described our invention in connection with specific embodiments thereof, it is to be clearly understood that this is done only by way of example, and not a limitation to the scope of our invention as set forth in the objects thereof and in the appended claims.

We claim:

1. A fluid-film, pocket bearing, for journaling a rotary shaft, comprising:
   an annulus having inner and outer circumferential surfaces, and an axial center;
   means defining a plurality of bearing pads on said inner surface;
   means communicating said inner and outer surfaces, for admitting fluid to said inner surface; and
   relieved pockets formed in said inner surface; wherein
   said pockets comprise means for effecting loading of said bearing predominantly horizontally thereof;
   said pockets each have a substantially uniform depth, throughout a substantial cicumferential length thereof, and leading and trailing edges, relative to a rotary direction of a given shaft to be journaled by said bearing;
   one of said edges is defined by diminishing depths which blend commonly into one of said bearing pads; and
   the other of said edges is defined by an abrupt, recessed step of said uniform depth.

2. A fluid-film, pocket bearing, for journaling a rotary shaft, comprising:
   an annulus having inner and outer circumferential surfaces, and an axial center;
   means defining a plurality of bearing pads on said inner surface;
   means communicating said inner and outer surfaces, for admitting fluid to said inner surface; and
   relieved pockets formed in said inner surface; wherein
   said pockets comprise means for effecting loading of said bearing predominantly horizontally thereof; and
   said pockets are formed in all of said bearing pads of said plurality, except for one given pad thereof.

3. A fluid-film, pocket bearing according to claim 2, wherein:
   a radial line drawn from said axial center, in traverse of said annulus, defines a location whereat bearing load of said annulus obtains;
   said inner surface has three of said bearing pads, equally spaced apart circumferentially thereof; and
   said one given bearing pad is substantially bisected by said radial line.

4. A fluid-film, pocket bearing, according to claim 2, wherein:
   said pockets each have a substantially uniform depth, throughout a substantial circumferential length thereof, and leading and trailing edges, relative to a rotary direction of a given shaft to be journaled by said bearing; and
   one of said edges is defined of diminishing depths which blend commonly into one of said bearing pads.

5. A fluid-film, pocket bearing, according to claim 4, wherein:
   said one edge is said trailing edge.

6. A fluid-film, pocket bearing, according to claim 5, wherein:
   said diminishing depths of said edge diminish uniformly.

7. A fluid-film, pocket bearing, according to claim 4, wherein:
   said pockets have walls which are inwardly spaced from axial ends of said inner surface.

8. A fluid-film, pocket bearing, according to claim 7, wherein:
   said walls are normal to the axis of said annulus.

9. A fluid-film, pocket bearing, according to claim 7, wherein:
   said walls are parallel.

10. A fluid-film, pocket bearing, according to claim 7, wherein:
    said walls converge toward one of said edges.

11. A fluid-film, pocket bearing, according to claim 7, wherein:
    said walls converge toward said trailing edge.

12. A fluid-film, pocket bearing, according to claim 7, wherein:
    said pockets each have a relieved surface recessed from said inner surface of said annulus; and
    said relieved surfaces are unfinished.

13. A fluid-film, pocket bearing, according to claim 4, wherein:
    said pockets each have a relieved surface recessed from said inner surface of said annulus; and
    said relieved surfaces have minute ribs formed thereon.

14. A fluid-film, pocket bearing, according to claim 13, wherein:
    said ribs are approximately one hundred microns in height.

15. A fluid-film, pocket bearing, according to claim 13, wherein:
    said ribs extend transverse to said relieved surfaces.

16. A fluid-film, pocket bearing, according to claim 13, wherein:
    said ribs extend parallel to the axis of said annulus.

17. A fluid-film, pocket bearing, according to claim 4, wherein:
    a radial line drawn from said axial center defines the location whereat bearing load of said annulus obtains; and
    said trailing edges of said pockets are located from one hundred and five to one hundred and thirtyfive degrees of arc, approximately, from said radial line.

18. A fluid-film, pocket bearing, according to claim 4, wherein:
said uniform depth is approximately from two to four times such clearance as is predetermined shall obtain between said pads and a given shaft to be journaled by said bearing.

19. A fluid-film, pocket bearing, according to claim 2, wherein:
said inner surface has a plurality of grooves formed therein; and
said communicating means comprises a plurality of ports formed in said annulus, each of said ports opening onto said outer surface and onto one of said grooves.

20. A fluid-film, pocket bearing, according to claim 19, wherein:
said grooves extend parallel to the axis of said annulus, and are equally spaced apart circumferentially of said inner surface.

21. A fluid-film, pocket bearing, according to claim 2, wherein:
said pockets extend, along the circumference of said inner surface, through substantially forty percent of said circumference.

22. A fluid-film, pocket bearing, according to claim 21, wherein:
each of said pockets extends along said circumference for approximately seventy-five degrees of arc.

23. A fluid-film, pocket bearing, according to claim 2, wherein:
each of said pockets is located from forty-five to one hundred and sixty-five degrees of arc, approximately, from another of said pockets adjacent thereto.

24. A fluid-film, pocket bearing, according to claim 2, wherein:
each of said pockets is located approximately forty-five degrees of arc from another of said pockets most adjacent thereto.

* * * * *